United States Patent
Chen et al.

(10) Patent No.: US 8,522,126 B1
(45) Date of Patent: Aug. 27, 2013

(54) BLOCKING MEMORY READBACK IN A PROGRAMMABLE LOGIC DEVICE

(75) Inventors: Zheng Chen, Upper Macungie, PA (US); Rohith Sood, Portland, OR (US); Loren McLaury, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 365 days.

(21) Appl. No.: 12/977,011

(22) Filed: Dec. 22, 2010

(51) Int. Cl.
*G06F 11/10* (2006.01)

(52) U.S. Cl.
USPC .......................................... 714/807; 714/763

(58) Field of Classification Search
USPC ................................................. 714/807, 763
See application file for complete search history.

(56) References Cited

U.S. PATENT DOCUMENTS

| | | | |
|---|---|---|---|
| 6,237,124 B1 * | 5/2001 | Plants | 714/763 |
| 7,257,750 B1 * | 8/2007 | Singh et al. | 714/732 |
| 7,328,377 B1 | 2/2008 | Lewis et al. | |
| 7,401,280 B1 | 7/2008 | Singh et al. | |
| 7,596,744 B1 | 9/2009 | Kow et al. | |
| 7,620,876 B2 | 11/2009 | Lewis et al. | |
| 7,634,713 B1 | 12/2009 | Ngo | |
| 7,702,978 B2 | 4/2010 | Lewis et al. | |
| 8,065,574 B1 * | 11/2011 | Cheng et al. | 714/725 |
| 8,183,881 B1 * | 5/2012 | Stassart et al. | 326/38 |
| 2005/0071730 A1 | 3/2005 | Moyer et al. | |

* cited by examiner

*Primary Examiner* — Philip Guyton

(57) ABSTRACT

A programmable logic device (PLD) is provided that includes: a configuration memory including a plurality of memory cells arranged according to rows and columns, wherein a subset of the rows are RAM rows, and wherein a subset of the columns in each RAM row are RAM columns and at least one column in each RAM row is a flag bit column, the memory cells corresponding to the flag bit column and RAM rows operable to store flag bit signals; a soft error detection (SED) circuit operable to read the configuration memory to derive a checksum; a logic circuit to determine if a RAM row is being read by the SED circuit that includes an asserted flag bit; and a blocking circuit that provides a known logical value to the SED circuit responsive to the logic circuit to block readback of the memory cells corresponding to the RAM rows and RAM columns.

11 Claims, 3 Drawing Sheets

BLOCKING MEMORY READBACK IN A PROGRAMMABLE LOGIC DEVICE

TECHNICAL FIELD

The present invention relates generally to programmable logic devices, and more particularly to soft error detection in programmable logic devices.

BACKGROUND

Programmable logic devices such as field programmable gate arrays (FPGAs) and complex programmable logic devices (CPLDs) are configured by a user to perform a desired logical function. This configuration involves a programming or configuration of a configuration memory in the devices. For example, in a field programmable logic device (FPGA), the configuration memory programs the truth table for look-up tables and programmable interconnects. In this fashion, the programmed FPGA can implement a desired logical function during operation.

In general, substantial portions of an FPGA's logical resources remain unused during user operation. If not used for other purposes, the configuration memory corresponding to the unused logical resources remains fallow as well. Thus, it is conventional for an FPGA to supplement its embedded RAM by configuring unused portions of the configuration memory as distributed random access memory (RAM) during user operation of the device. Since the unused memory is not storing any truth tables or other necessary configuration data, there is no harm in writing over the unused portions designated as RAM during user operation.

The use of configuration memory as RAM makes the resulting FPGA less costly to manufacture in that the need for additional die space for RAM is alleviated. However, an issue arises during use in that configuration memory, like other types of memory, can suffer from soft errors. Even though a memory may be constructed correctly, events such as cosmic rays or other types of radiation can readily change the bit stored by one of its memory cells. In an FPGA, such a soft error is actually a "firm" error in that the entire programming of the device may be ruined by just a single bit error in the necessary configuration data. Thus, it is conventional for configuration memories to be repeatedly analyzed for any soft error events during device operation. Such soft error detection (SED) is typically performed by first calculating a cyclic redundancy check (CRC) checksum for the configuration data prior to configuring the device. After configuration and during operation, the CRC is repeatedly calculated by retrieving the configuration data from the configuration memory and running the CRC algorithm on the retrieved data accordingly. The presence of any errors in the configuration data is thus revealed by a corresponding change in the CRC checksum. Upon detection of corrupt configuration data, the hardware or software in the FPGA controlling the SED function can then command the FPGA to reconfigure the configuration memory.

Configuration memory being used as RAM during normal operation of the FPGA will naturally have its content change as data is written or re-written to the RAM portions. The RAM configuration memory portions must thus be blocked from readback while the SED function is implemented or the normal RAM content change could be interpreted as corruption of the configuration data. For example, it is conventional to block readback of the RAM portions through a modification of the data shift register (DSR) used to shift in the configuration data to the device. But such modification can result in the DSR having less sensitive sense amplifiers. Alternatively, the readback blocking can be performed using a combination of control logic, latches, and counters. But such an alternative adds to design complexity and increases costs. Accordingly, there is a need in the art for improved readback blocking for programmable logic devices.

SUMMARY

In accordance with an embodiment, a programmable logic device (PLD) is provided that includes: a configuration memory arranged according to configuration data words, wherein a subset of the configuration data words are configurable to include RAM portions writeable during operation of the PLD, and wherein each configuration data word in the subset includes a flag bit that is asserted if the configuration data word is configured to include the RAM portion; a logic circuit operable to detect whether the flag bits are asserted in the subset of configuration data words; a blocking circuit responsive to the detection by the logic circuit by suppressing the RAM portions to a predetermined logical state, the configuration data words thereby forming a subset of suppressed configuration data words and a subset of unsuppressed configuration data words; and a soft error detection (SED) circuit operable to calculate a checksum from suppressed and unsuppressed configuration data words.

In accordance with an embodiment, a programmable logic device (PLD) is provided that includes: a configuration memory including a plurality of memory cells arranged according to rows and columns, wherein a subset of the rows are RAM rows, and wherein a subset of the columns in each RAM row are RAM columns and at least one column in each RAM row is a flag bit column, the memory cells corresponding to the flag bit column and RAM rows operable to store flag bit signals; a soft error detection (SED) circuit operable to read the configuration memory to derive a checksum; a logic circuit to determine if a RAM row is being read by the SED circuit that includes an asserted flag bit; and a blocking circuit that provides a predetermined logical value to the SED circuit responsive to the logic circuit to block readback of the memory cells corresponding to the RAM rows and RAM columns.

In accordance with an embodiment, a method of blocking readback for a configuration memory is provided that includes retrieving a word from the configuration memory as part of a checksum calculation; determining whether the retrieved word corresponds to a distributed RAM portion of the configuration memory and includes an asserted flag bit; and if the flag bit is asserted, excluding the retrieved word from the checksum calculation.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
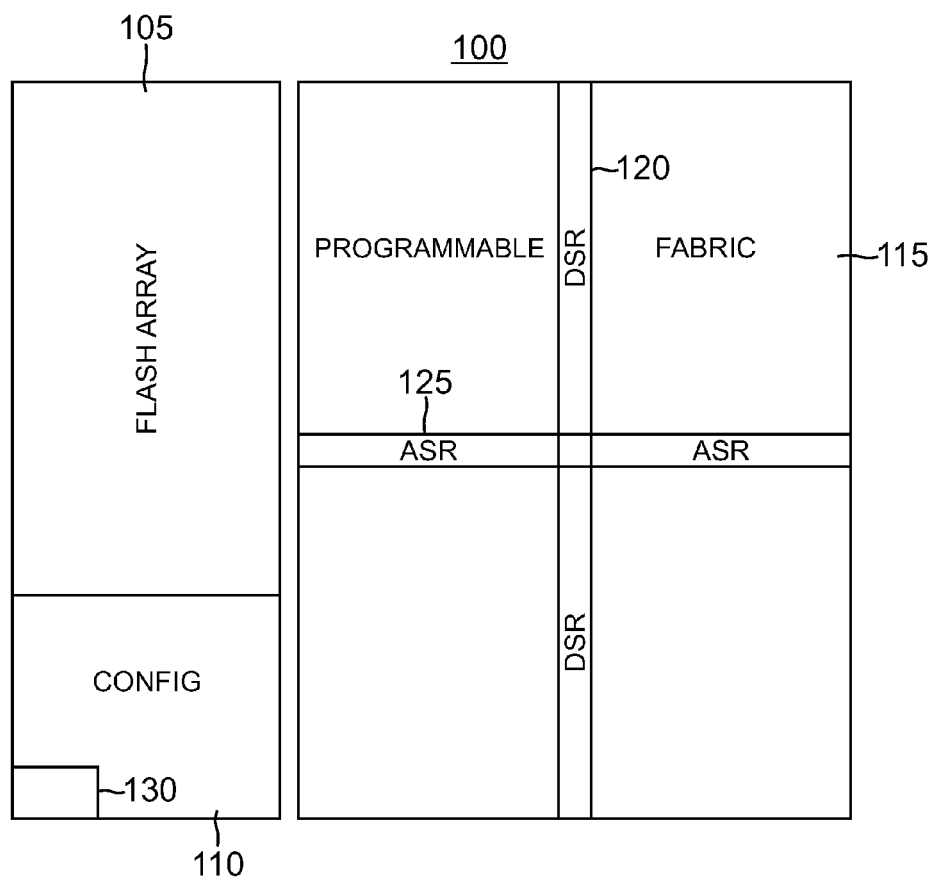
FIG. 1 is a functional block diagram of an FPGA configured to implement readback blocking according to an embodiment of the invention.

Turning now to the drawings, FIG. 1 illustrates a field programmable gate array (FPGA) 100 configured to implement an embodiment of the improved readback blocking disclosed herein. FPGA 100 includes both a non-volatile FLASH array 105 and a volatile static random access memory (SRAM) configuration memory 110. As known in the programmable logic device (PLD) arts, SRAM configuration memory 110 includes a programmable fabric 115 with logical resources such as truth tables as well as a programmable interconnect. By configuring programmable fabric 115 appropriately, a user can have FPGA 100 operate according to a desired logical function. Such configuration occurs according to a configuration bitstream generated by an external programming tool (not illustrated). The programming tool loads the configuration bitstream serially into a data shift register (DSR) 120. DSR 120 is sized according to the width of SRAM configuration memory 110. Configuration data words serially shifted into DSR 120 are then shifted out to configure the appropriate configuration memory cells in configuration SRAM 110 as determined by an address from a configuration address shift register (ASR) 125. Configuration data is also stored in FLASH array 105 so that FPGA 100 can reboot from FLASH 105 should configuration data in SRAM 110 be corrupted. Thus, FLASH 105 is normally configured prior to configuration of SRAM 110.

To check the integrity of the stored configuration data in SRAM configuration memory 110, FPGA 100 includes an SED engine 130 that calculates a checksum for the configuration data. In general, whatever algorithm is used will calculate a checksum that is sensitive to change of the original data used to calculate the checksum. Although numerous algorithms can be used to detect soft errors, it will be assumed herein without loss of generality that engine 130 uses a cyclic redundancy check (CRC) algorithm. Thus, SED engine 130 is configured with the appropriate CRC code or checksum during configuration of FPGA 100. During subsequent operation of FPGA 100, SED engine 130 periodically retrieves the configuration data from configuration SRAM 110 and checks to see if the CRC code has changed. If the CRC code has changed, SED engine 130 has thus detected a corruption of the configuration data. SED engine 130 then triggers a reconfiguration of SRAM 110 using an image of the configuration data stored in flash array 105. Alternatively, should SED engine 130 be in an FPGA that does not have non-volatile storage, the configuration data would be provided from an external source.

Figure 2:
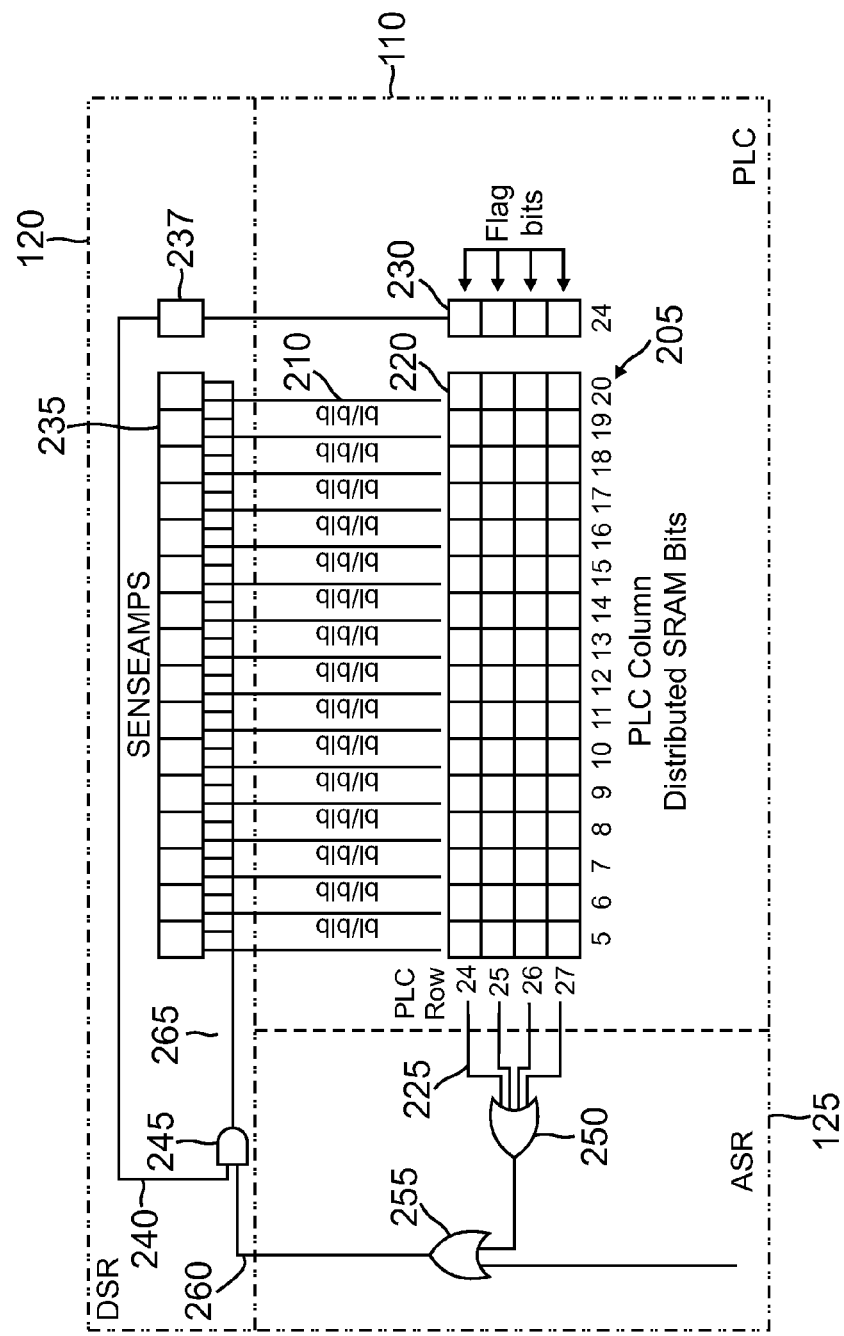
FIG. 2 is a schematic diagram of the readback blocking circuitry of FIG. 1.

Since the calculation of the CRC code is so sensitive to change of the underlying data, it will change if the CRC code calculation includes areas of SRAM 110 used as RAM since RAM contents will naturally change responsive to writes or re-writes during operation of FPGA 100. Turning now to FIG. 2, configuration SRAM 110 is configured to store flag bits to prevent SED engine 130 from including RAM portions in the CRC code calculation. In this embodiment, a RAM portion 205 is four two-byte rows. In that regard, SRAM 110 is organized into rows and columns. As known in the SRAM arts, each row is addressed by asserting a corresponding word line 225. Each memory cell 220 stores a bit of data in both a true and complement form. When the memory cell's word line is asserted by ASR 125, the true and complement bits are coupled to corresponding true and complement bit lines. The bit lines are arranged according to the memory's columns. For illustration clarity, the bit and bit complement lines for each column in SRAM 110 are illustrated as single bit lines 210. Each bit line 210 is thus denoted as "bit line/bit line bar" (bt/blb) in SRAM 110. For further illustration clarity, memory cells 220, word lines 225, and bit lines 210 are only illustrated for RAM portion 205. RAM portion 205 corresponds to rows 24 through 27 and columns 5 through 20. Thus, RAM portion 205 can store eight bytes of data (sixty-four bits).

It will be appreciated that SRAM 110 will typically be of a size to store millions of configuration bits or more, depending upon the size of programmable fabric 115. Thus, SRAM 110 will have the resources to provide many RAM portions 205. As shown in FIG. 2, each RAM portion row is associated with a flag bit. Thus, RAM portion 205 may be associated with a column of four flag bits stored in memory cells 230. In general, a RAM portion 205 may simply be used to store configuration data in line with the remainder of SRAM 110. The decision as to whether RAM portion 205 is enabled as distributed RAM is made during configuration of FPGA 100. A user will determine the various logical functions that are desired and have a programming software tool generate the configuration bits accordingly. At the same time, the programming tool will decide how many RAM portions 205 to enable. The resulting configuration bit stream will include asserted flag bits for memory cells 230 for each RAM portion 205 that is enabled.

Memory cells 230 are thus dedicated to RAM portion 205 enablement and are unavailable for storing configuration data even if the corresponding RAM portion is not enabled and instead used to store configuration bits.

To test whether the flag bits in memory cells 230 are asserted, both address shift register (ASR) 125 and data shift register (DSR) 120 are modified. It will be appreciated that, as known in the FPGA arts, an FPGA's ASR and DSR are not merely shift registers but also include related components necessary for their function. For example, a user can verify that the data shifted into the configuration memory is the data intended by directly reading from the configuration memory as opposed to merely relying on a checksum. Thus, a DSR will include the sense amplifiers necessary to make a bit decision as to the contents of the accessed memory cells during a readback of the configuration data. Referring again to FIG. 2, each bit line 210 associates with a corresponding sense amplifier 235 within DSR 120. SED engine 130 of FIG. 1 uses the bit decisions from sense amplifiers 235 to calculate the desired checksum. The configuration data is retrieved a configuration data word at a time by asserting the corresponding word line 225.

In general, the word size (and hence number of columns) for a configuration memory is typically determined by the programmable fabric organization. In that regard, an FPGA typically organizes logic resources such as lookup tables (LUTs) within the fabric into a plurality of programmable logic blocks. For example, each programmable logic block may include four sixteen-bit lookup tables such that sixty-four bits are needed to program the truth tables for such a programmable logic block. A number of other bits are necessary to complete the programming of a programmable logic block—for instance, in one embodiment of an FPGA, each programmable logic block requires 66 configuration memory bits. Thus, a convenient length for the configuration data shift register (DSR) in such an FPGA would match this size so as to be 66 bits long. The entire contents of the DSR are shifted out in parallel as a configuration data word. The corresponding width for the corresponding configuration SRAM for such an embodiment would be sixty-six bits, which corresponds to sixty-six columns.

Regardless of the word size for SRAM 110 of FIG. 2, the configuration data is retrieved a word at a time by asserting the corresponding word line 225. If no flag bits are asserted, the entire set of bit lines 210 couple the memory contents of the accessed memory cells 220 in the asserted row to the corresponding sense amplifiers 235. In the embodiment of FIG. 2, RAM portion 205 is along row numbers 24, 25, 25, and 27 of SRAM 110. However, within those rows, RAM portion 205 is restricted to columns 5 through 20. The flag bits are stored in column 24 for those rows. It will be appreciated, however, that RAM portions may be placed in different rows of course and not be restricted to those columns either. Similarly, the particular column used to store the corresponding flag bits is arbitrary as well so long as it is outside those columns dedicated to the RAM portions.

The readback blocking for the embodiment of FIG. 2 occurs by determining that one or more of the flag bits in memory cells 230 is asserted. As discussed above, when a word line is asserted, all the memory cells in the corresponding row are accessed. For example, when row 25 in RAM portion 205 is accessed, the flag bit in memory cell 230 in column 24 for that row is also accessed. A sense amplifier 237 determines the asserted state for such a flag bit and a resulting data signal 240 from the sense amplifier is received at an AND gate 245 within DSR 120. Sense amplifier 237 will also determine the data signal from other memory cells in column 24 when word lines outside of RAM portion 205 are asserted. It will often be the case that some of those other memory cells will store a logical "1" state such that data signal 240 will also be interpreted as true (assuming that SRAM 110 is a logical high system) even though the flag bits are not being read in such a case. This is because column 24 extends across numerous memory rows that are not configurable as distributed RAM. When those rows are read, it may be the case that bits corresponding to column 24 are asserted. But that bit assertion is simply corresponding to configuration data and is not related to flag bits indicating that readback should be blocked. Thus, it is not sufficient to merely determine if sense amplifier 237 is detecting an asserted bit, that asserted bit must also be coming from the rows corresponding to RAM portion 205. To provide such a detection, word lines 225 from RAM portion 205 are received at an OR gate 250 within ASR 125. An output of OR gate 250 is thus asserted when any of the word lines 225 within RAM portion 205 are asserted. Because SRAM 110 may contain numerous RAM portions, the output of OR gate 250 is received at a secondary OR gate 255 that also receives the OR gate output from a subsequent (higher row number) RAM portion secondary OR gate (not illustrated). In this fashion, a series or RAM portions may have their various word lines all logically OR'd to produce a RAM portion word line asserted signal 260 that is received by AND gate 245. AND gate 245 can thus determine if a flag bit is asserted by determining that data signal 240 and word line asserted signal 260 are both true.

Figure 3:
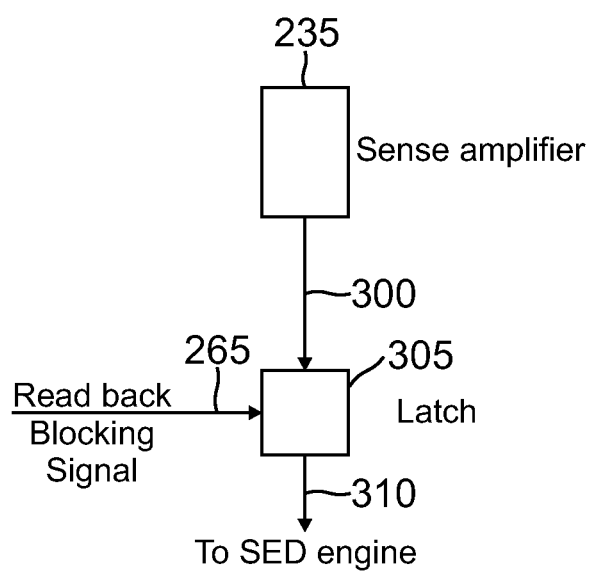
FIG. 3 is a block diagram of a blocking circuit that overrides a sense amplifier bit decision if the sense amplifier is sensing the contents of a RAM portion memory cell.

The output of AND gate 245 forms a readback blocking signal 265. If readback blocking signal 265 is true, it suppresses and overrides the bit decisions from sense amplifiers 235. For example, as seen in FIG. 3, sense amplifier 235 may provide a bit decision signal 300 to a set-reset latch 305. Set-reset latch 305 is also responsive to readback blocking signal 265 such that a read signal 310 from latch 305 is forced to a known state when readback blocking signal 265 is true. This known state can be either false or true, it doesn't matter so long as the CRC checksum is initially calculated with this known state. For example, it may be assumed that all RAM portion bits should be sensed as false during a readback blocking. The initial calculation of the checksum would thus include all RAM portion bits as zeroes (in a logic high system). Latch 305 will thus force read signal 310 into this binary zero state responsive to readback blocking signal 265 being true. When readback blocking signal 265 is false, read signal 310 follows whatever logic state that bit decision signal 300 is in as determined by sense amplifier 235. Only sense amplifiers 235 are blocked in this fashion. Thus, the sense amplifiers (not illustrated) for the remaining columns in SRAM 110 control the state of their respective read signals provided to the SED engine without any interference from the readback blocking signal.

FIG. 2 illustrates just one embodiment of the invention. Thus, other types of logic circuits can be implemented to detect whether a flag bit for a RAM portion row is asserted. Moreover, other types of blocking circuitry can be used to suppress the sense amplifier bit decisions for columns corresponding to RAM portions. Accordingly, the embodiments described above illustrate but do not limit the invention. It should also be understood that numerous modifications and variations are possible in accordance with the principles of the present invention. The disclosure should be construed as defined by the metes and bounds of the following claims.

What is claimed is:

1. A programmable logic device (PLD), comprising:
   a configuration memory including a plurality of memory cells arranged according to rows and columns with corresponding wordlines and bitlines, wherein a portion of the configuration memory is useable as RAM, and wherein a memory column associated with the RAM portion is operable to store a flag bit in a memory cell for each row of the RAM portion;
   a sense amplifier coupled to the associated memory column and operable to detect whether the flag bit for a row of the RAM portion is set when the wordline for the row is asserted; and
   a blocking circuit coupled to the sense amplifier and operable to provide to an SED circuit a known logical value for the row of the RAM portion when the flag bit for the row is set and the wordline for the row is asserted.

2. The PLD of claim 1 including:
   a first logic circuit coupled to a wordline for a row of the RAM portion and operable to detect whether the wordline is being asserted; and
   a second logic circuit with inputs coupled to the outputs of the sense amplifier and the first logic circuit and an output coupled to the blocking circuit, the second logic circuit operable to detect when the flag bit for the row is set and the wordline for the row is asserted.

3. The PLD of claim 2, wherein the second logic circuit is an AND gate.

4. The PLD of claim 2, wherein the first logic circuit is an OR gate.

5. The PLD of claim 2, wherein the first logic circuit is coupled to a plurality of wordlines for a plurality of rows of the RAM portion and is operable to detect whether any of the wordlines is being asserted.

6. The PLD of claim 2 including:
   a plurality of RAM portions each with an associated first logic circuit; and a third logic circuit with inputs coupled to the outputs of the associated first logic circuits and an output coupled to an input of the second logic circuit.

7. The PLD of claim 1, further comprising:
a plurality of sense amplifiers corresponding to the configuration memory's plurality of columns, wherein each column in the configuration memory couples through a bit line to the corresponding sense amplifier and the corresponding sense amplifier provides a bit decision to the blocking circuit; and
the blocking circuit comprises a plurality of latches corresponding to the plurality of sense amplifiers, each latch receiving the corresponding sense amplifier's bit decision and providing an output that, when the wordline for a row of the RAM portion is asserted, follows the bit decision if the flag bit for the row is not set and providing the known logical value if the flag bit for the row is set.

8. The PLD of claim 1, wherein the SED circuit uses a CRC algorithm to calculate the checksum.

9. The PLD of claim 1, wherein the PLD is a field programmable gate array (FPGA).

10. A method comprising:
providing a configuration memory including a plurality of memory cells arranged according to rows and columns with corresponding wordlines and bitlines, wherein a portion of the configuration memory is useable as RAM, and wherein a memory column associated with the RAM portion is operable to store a flag bit in a memory cell for each row of the RAM portion;
detecting whether the flag bit for a row of the RAM portion is set when the wordline for the row is asserted; and
providing to an SED circuit a known logical value for the row of the RAM portion when the flag bit for the row is set and the wordline for the row is asserted.

11. The method of claim 10 including not providing the known logical value to the SED circuit if the flag bit for the row is not set.

\* \* \* \* \*